United States Patent
Cook

(10) Patent No.: US 7,352,154 B2
(45) Date of Patent: Apr. 1, 2008

(54) ELECTRICAL SYSTEM CONTROL FOR A VEHICLE

(75) Inventor: Alexander Cook, Dublin, OH (US)

(73) Assignee: Vanner, Inc., Hilliard, OH (US)

( * ) Notice: Subject to any disclaimer, the term of this patent is extended or adjusted under 35 U.S.C. 154(b) by 232 days.

(21) Appl. No.: 11/035,830

(22) Filed: Jan. 14, 2005

(65) Prior Publication Data

US 2005/0151509 A1 Jul. 14, 2005

Related U.S. Application Data

(60) Provisional application No. 60/536,328, filed on Jan. 14, 2004.

(51) Int. Cl.
*H02J 7/00* (2006.01)

(52) U.S. Cl. .................................... 320/116; 320/118

(58) Field of Classification Search ............... 320/116, 320/118
See application file for complete search history.

(56) References Cited

U.S. PATENT DOCUMENTS

| | | | |
|---|---|---|---|
| 4,317,165 A | 2/1982 | Sullivan | |
| 4,479,083 A | 10/1984 | Sullivan | |
| 4,743,830 A | 5/1988 | Lakey | |
| 4,855,888 A | 8/1989 | Henze et al. | |
| 5,157,593 A | 10/1992 | Jain | |
| 5,373,196 A | 12/1994 | Faley | |
| 5,452,197 A | 9/1995 | Rice | |
| 5,734,258 A | 3/1998 | Esser | |
| 5,777,864 A | 7/1998 | Seong et al. | |
| 5,982,142 A | 11/1999 | Sullivan et al. | |
| 6,150,795 A | 11/2000 | Kutkut et al. | |
| 6,154,375 A | 11/2000 | Majid et al. | |
| 6,483,731 B1 | 11/2002 | Isurin et al. | |
| 6,636,431 B2 | 10/2003 | Seki et al. | |
| 6,670,789 B2 * | 12/2003 | Anzawa et al. | ............. 320/118 |
| 2004/0135544 A1 * | 7/2004 | King et al. | ................. 320/116 |

(Continued)

OTHER PUBLICATIONS

A. Isurin, A.Cook, A Novel Resonant Converter Topology and its Application, IEEE Power Electronics Specialists Conference, PESC 2001, vol. 2, pp. 1039-1044, Vancouver, BC, Canada, Jan. 2001.

(Continued)

*Primary Examiner*—Bao Q. Vu
*Assistant Examiner*—Nguyen Tran
(74) *Attorney, Agent, or Firm*—James R. Elvey; Michael A. Forhand; Eley Law Firm Co.

(57) ABSTRACT

An electrical system control for a vehicle having a charging source, a first battery connected in series with a second battery to form a primary power supply that is connected to the charging source, and a third battery forming a secondary power supply. The system comprises a first bidirectional battery equalizer connected to the charging source and further connected to the second battery, a second bidirectional battery equalizer connected to the charging source and further connected to the third battery, and a controller adapted to monitor the state of at least one of the charging source and the first, second and third batteries. The controller also controls the operation of at least one of the first and second bidirectional battery equalizers in a predetermined manner, effective to control the charge and discharge of at least one of the first, second and third batteries.

22 Claims, 4 Drawing Sheets

U.S. PATENT DOCUMENTS

2004/0232879 A1 11/2004 Wang et al.

OTHER PUBLICATIONS

R. Oruganti, P.C. Heng, J.T.K. Guan, L. A. Choy, Soft-Switched DC/DC Converter with PWM Control, IEEE Transactions on Power Electronics, vol. 13, No. 1, Jan. 1998, pp. 102-113.

G. S. N. Raju, S. Doralda, An LCL Resonant Converter with PWM Control-Analysis, Simulation, and Implementation, IEEE Transactions on Power Electronics, vol. 10, No. 2, Mar. 1995, pp. 164-173.

H. Li, F.Z. Peng, J. Lawler, Modeling, Simulation, and Experimental Verification of Soft-Switched Bi-Directional DC-DC Converters, IEEE Applied Power Electronics Conference and Exposition, APEC 2001, vol. 2, pp. 736-744, Anaheim, CA, Mar. 2001.

N.H. Li, F.Z. Peng, J.S. Lawer, A Natural ZVS Medium-Power Bidirectional DC-DC Converter With Minimum Number of Devices, IEEE Transactions on Industry Applications, vol. 39, No. 2, Mar./Apr. 2003, pp. 525-535.

O. Q. Zhao, Fred C. Lee, High-Efficiency, High Step-Up DC-DC Converters, IEEE Transactions on Power Electronics, vol. 18, No. 1, Jan. 2003, pp. 65-73.

M. Ishida, H. Fujino, T. Hori, Real-Time Output Voltage Control Method of Quasi-ZCS Series Resonant HF-Linked DC-AC Converter, IEEE Transactions on Power Electronics, vol. 10, No. 6, Nov. 1995, pp. 776-783.

.C. Hsieh, C. H. Lin, J. M. Li, Y. C. Hsu, A Study of Series-Resonant DC/AC Inverter, IEEE Transactions on Power Electronics, vol. 11, No. 4, Jul. 1996, pp. 641-652.

I. Batarseh, Resonant Converter Topologies with Three and Four Energy Storage Elements, IEEE Transactions on Power Electronics, vol. 9, No. 1, Jan. 1994, pp. 64-73.

J. L. Lin, J. S. Lew, Robust Controller Design for a Series Resonant Converter Via Duty-Cycle Control, IEEE Transactions on Power Electronics, vol. 14, No. 5, Sep. 1999, pp. 793-801.

* cited by examiner

ELECTRICAL SYSTEM CONTROL FOR A VEHICLE

This application claims priority to U.S. provisional application 60/536,328, filed Jan. 14, 2004, the contents of which are hereby incorporated by reference.

FIELD

This invention relates to a system for providing and controlling portable electric power. In particular, this invention relates to a system for controlling charging and discharge of batteries in a vehicle having a plurality of battery power supplies.

BACKGROUND

There is a desire on the part of vehicle manufacturers to increase the "electrification" of vehicle auxiliary loads by reducing the number of accessories that depend directly on the fueled-engine as a prime mover. Examples include power steering pumps, hydraulic drives, engine cooling fan, air conditioning compressor, oil and coolant pumps, and air compressors. An advantage of accessory electrification is reduced engine loading, which facilitates greater engine performance, increased flexibility in locating accessories, reduced fuel consumption, more efficient accessory operation, and reduced emissions.

A typical way to manage a large number of electrical loads in a vehicle is to provide an electrical system having a higher voltage, such as 24 volts, and providing taps for connecting lower-voltage accessories, such as 12 VDC accessories. For this purpose, two 12 volt batteries can be connected in series with a center tap. The accessories are connected to the "lower" battery, i.e., the battery connected between an electrical ground and the center tap.

One disadvantage of series-connected batteries in a vehicle is the predominance of 12 VDC accessories being connected to one or more taps of a higher-voltage battery supply. Since many of these accessories are often installed after the vehicle is placed in service, and sometimes by unskilled personnel, the vehicle manufacturer has no means to anticipate battery loading. As a result, individual batteries in the series of multiple batteries may be under- or overcharged. Another disadvantage of series-connected batteries is that the batteries may be mismatched due to differences in age, condition and design. This can also lead to under- or over-charging of individual batteries in the series.

Some vehicles may have several battery power supplies. For example, a vehicle may have a primary battery supply for powering the engine starter and a secondary battery supply for powering accessories. Each battery supply may be assembled from a plurality of batteries. The discharge and load characteristics can vary considerably between the primary and secondary battery supplies. For example, the primary battery supply is used to provide high current for a relatively short period of time to start the engine while the secondary battery supply is used to provide a smaller amount of current to the vehicle's accessories for a longer period of time. The types of batteries used in the primary and secondary battery supplies may also be different. For example, a primary battery supply may use flooded lead-acid batteries while the secondary battery supply may use deep cycle absorbed glass mat ("AGM") lead acid batteries. Each type of battery can have differing charge requirements. There is a need for a way to tailor battery charging for each battery, in each battery system. There is a further need for a way to route power between the primary and secondary battery power supplies in the event that one supply is needed to charge or augment the other supply.

SUMMARY

According to the present invention, a system for providing and controlling portable electric power is disclosed. Improvements over current systems are presented in the area of vehicle power management. At least one DC-DC converter in the form of a battery equalizer controls charging of batteries in primary and secondary supplies, and between the supplies. The battery equalizer is bidirectional, enabling the battery equalizer to both charge the batteries and to direct power between charged and discharged batteries.

One aspect of the present invention is a control for a vehicle electrical system having a charging source and a first battery connected in series with a second battery to form a power supply that is connected to the charging source. The electrical system control comprises a bidirectional battery equalizer connected to the charging source and further connected to the second battery, and a controller to monitor the state of at least one of the charging source, the first battery and the second battery and control the operation of the bidirectional battery equalizer in a predetermined manner. The control is effective to control the charge and discharge of at least one of the first and second batteries.

Another aspect of the present invention is a control for a vehicle electrical system having a charging source, a first battery connected in series with a second battery to form a primary power supply that is connected to the charging source, and a third battery forming a secondary power supply. The system comprises a first bidirectional battery equalizer connected to the charging source and further connected to the second battery, a second bidirectional battery equalizer connected to the charging source and further connected to the third battery, and a controller adapted to monitor the state of at least one of the charging source and the first, second and third batteries. The controller also controls the operation of at least one of the first and second bidirectional battery equalizers in a predetermined manner, effective to control the charge and discharge of at least one of the first, second and third batteries.

Yet another aspect of the present invention is a control for a vehicle electrical system having a charging source, a first battery connected in series with a second battery to form a primary power supply that is connected to the charging source, and a third battery forming a secondary power supply. The vehicle electrical system control comprises a first bidirectional battery equalizer connected to the charging source and further connected to the second battery, the first bidirectional battery equalizer including a switching-type converter, a second bidirectional battery equalizer connected to the charging source and further connected to the third battery, the second bidirectional battery equalizer including a switching-type converter, and a controller adapted to monitor the state of at least one of the charging source and the first, second and third batteries. The controller controls the operation of at least one of the first and second bidirectional battery equalizers in a predetermined manner, effective to control the charge and discharge of at least one of the first, second and third batteries by selective configuration of the direction of current flow through the first and second bidirectional battery equalizers and by selective reconfiguration of each of the first and second bidirectional battery equalizers as one of a buck-type switching converter and a boost-type switching converter.

Another aspect of the present invention is a method for controlling the electrical system of a vehicle having a charging source, a first battery connected in series with a second battery to form a primary power supply that is connected to the charging source, and a third battery forming a secondary power supply. The method comprises the steps of connecting a first bidirectional battery equalizer to the charging source and to the second battery, connecting a second bidirectional battery equalizer to the charging source and to the third battery, and monitoring the state of at least one of the charging source and the first, second and third batteries and controlling the operation of at least one of the first and second bidirectional battery equalizers in a predetermined manner, effective to control the charge and discharge of at least one of the first, second and third batteries.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
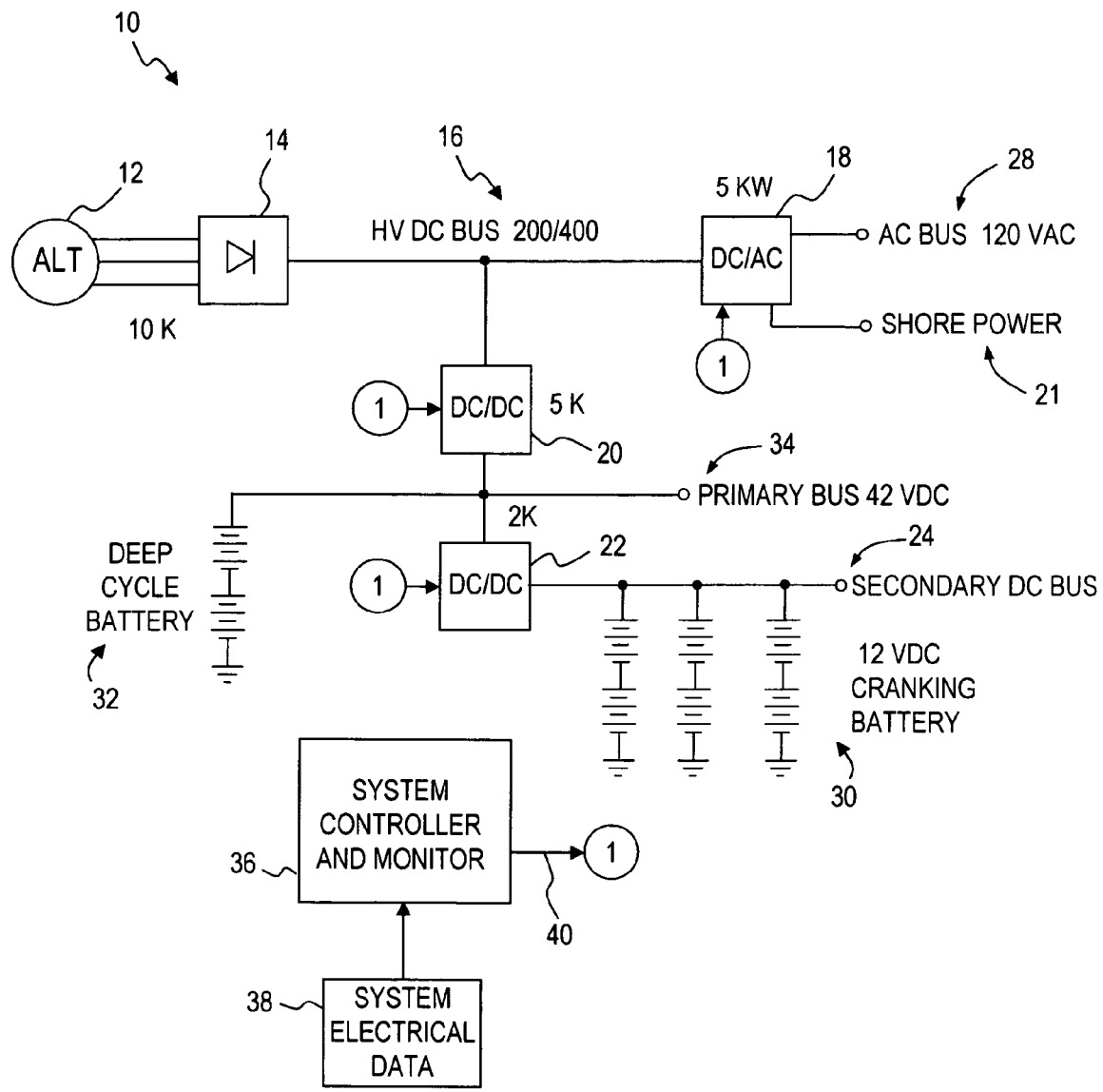
FIG. 1 is a schematic block circuit diagram of a vehicle power management system according to an embodiment of the present invention.

In the discussion that follows and in the accompanying figures, like reference numerals are used to indicate components having substantially the same structure or function. In addition, in the figures, a numeral within a circle indicates a common point of connection for an attached structure or functional block. For example, each component in a figure having a connection to or from an encircled (1) are logically and/or electrically connected together.

With reference to FIG. 1, a power management system 10 is shown according to an embodiment of the present invention. High-voltage AC generated by an alternator 12 is rectified to DC by a rectifier 14, forming a high voltage DC bus 16. A high voltage is preferable for increased alternator efficiency and for voltage-changing flexibility during subsequent power conversion. A DC/AC inverter 18 receives input power from high voltage bus 16 and converts the DC input power to a predetermined AC voltage and current capacity to power vehicle accessories connected to an AC bus 28. A first DC/DC converter 20 receives input power from high voltage bus 16 and converts the input power to a predetermined DC output voltage and current capacity. The output of converter 20 forms a primary bus 34 in conjunction with a first battery 32 to provide power to devices connected to the primary bus, such as accessories. A second DC/DC converter 22 receives input power from primary bus 34 and converts the input power to a voltage and current output suitable for charging a second battery 30 connected thereto and providing power to secondary bus 24 to power devices connected to the secondary bus, such as a starter for the vehicle's engine.

A system controller and monitor 36 monitors system data 38 relating to the operational status of various portions of system 10, i.e., voltage and current at the various sub-system inputs and outputs, including, but not limited to, alternator 12, high voltage bus 16, primary bus 34, secondary bus 24, AC bus 28, DC/AC converter 18, DC/DC converters 20, 22 and batteries 30, 32. System data 38 may further include data relating to system faults, external commands, and so on. Controller 36 responds to the system data 38 in a predetermined manner to control the operation of inverter 18 and converters 20, 22 to regulate at least one of the voltage and current of at least one of the AC bus 28, primary bus 34 and secondary bus 24, and charge batteries 30, 32. In system 10 a higher-voltage primary bus 34 preferably powers engine accessories while engine cranking power is supplied by a lower-voltage secondary bus 24.

Inverter 18 may directly convert the high voltage DC of bus 16 to a corresponding high voltage AC without the need for a step-up transformer, thus reducing system weight and cost. Inverter 18 must be rated at the full AC output specification since the inverter is the only source of AC power output. For example, if 10 kW of AC output power is required from system 10, inverter 18 must be configured to supply the entire 10 kW. Inverter 18 may be bidirectional and thus additionally capable of converting externally-supplied AC power (i.e., shore power 21) to a high voltage DC and supplying the high voltage DC to bus 16. DC/DC converter 20 may in turn utilize this energy to charge first battery 32 and provide power to primary bus 34. DC/DC converter 22 may likewise utilize the shore power by receiving the power through DC/DC converter 20 to charge second battery 30 and power secondary bus 24. Shore power 21 thus allows operation of power management system 10 during times when power from alternator 12 is unavailable.

DC/DC converter 20 may be bidirectional, thus additionally capable of augmenting alternator 12 by converting power from battery 32 (and/or an external source of power connected to the primary bus 34) to a high voltage compatible with high voltage bus 16 during periods of high load demand on inverter 18. The amount of available additional power supplied to bus 16 by DC/DC converter 20 is limited by the capacity of the DC/DC converter. For example, if a 15 kW inverter 18 is supplied by a 10 kW alternator 12, a 5 kW DC/DC converter 20 is required to supply the additional power needed for the inverter to operate at its full capacity. This configuration also allows at least limited operation of power management system 10 from battery 32 when power is not being provided by alternator 12.

DC/DC converter 22 may also be bidirectional and thus additionally capable of augmenting power available to primary bus 34 by converting power from battery 30 (and/or an external source of power connected to the primary bus) to a voltage compatible with the primary bus and providing the converted voltage to the primary bus. DC/DC converter 22 may also indirectly supply power to high voltage bus 16 through DC/DC converter 20 in the manner previously described, thus supporting operation of inverter 18.

With reference to FIG. 1, with appropriately rated bidirectional DC/DC converters 20, 22, alternator 12 power can be supplied to or from any of high voltage bus 16, primary bus 34 and secondary bus 24. Thus, a high- or low-voltage alternator 12 may be used in system 10. For example, if a high voltage alternator 12 is used, the rectified voltage output from rectifier 14 is connected directly to high voltage bus 16, as shown in FIG. 1. If a low voltage alternator is used, the output of rectifier 14 may be directly connected to primary bus 34. In this configuration, power for inverter 18 is supplied to high voltage bus 16 via bidirectional DC/DC converter 20 in the manner previously described. Alternatively, rectifier 14 may be connected directly to secondary bus 24. In this configuration the power is supplied to primary bus 34 through bidirectional DC/DC converter 22 and, in turn, to high voltage bus 16 through bidirectional DC/DC converter 20.

If there is insufficient power to start the vehicle's prime mover from cranking battery 30, power may be fed into system 10 via multiple buses from an external source, usually another vehicle which typically directly supplies power of a suitable voltage and current to battery 30. Alternatively, AC power from an external source may be fed back into the AC bus 28 or a shore power input 21 of a bidirectional configuration of inverter 18, rectified in the inverter, and routed through DC/DC converters 20, 22 to charge battery 30. If DC/AC inverter 18 and DC/DC converters 20, 22 have sufficient capacity, the external AC power may also be used to start the vehicle's engine.

If DC/DC converter 20 is bidirectional, it can also provide support for alternator 12 when high voltage bus 16 is heavily loaded and further allow operation of system 10 from either or both of batteries 30, 32 if alternator 12 is not providing power. For example, DC/DC converter 20 can be configured to supply additional power from battery 32 to high voltage bus 16 in the manner previously described, to augment power being supplied to the high voltage bus by alternator 12 during periods of heavy high voltage bus loading, thus maintaining the voltage level of the high voltage bus.

If inverter 18 is bidirectional, the inverter can rectify AC power, supplied externally to the inverter through AC bus 28 or shore power 21, to DC and supply the DC power to primary bus 34. Charging of battery 32 may be accomplished through DC/DC converter 20 in the manner previously described. Battery 30 may in turn be charged in the manner previously described through DC/DC converter 22, which is connected to primary bus 34. Thus, when external AC power is connected to inverter 18 the external AC voltage may be rectified by the inverter and supplied to high voltage bus 16 to provide power to DC/DC converters 20, 22 and charge batteries 30, 32 as well as supply power to primary bus 34 and secondary bus 24 in the manner previously described.

In an alternate embodiment of system 10 most high-power accessories are operated from primary bus 34 while secondary bus 24 is used to power relatively low-current devices at a voltage lower than that of the primary bus. In this configuration primary bus 34 may be supported by cranking batteries 30 in place of battery 32, and secondary bus 24 may or may not include a battery, such as a deep cycle battery 32.

Figure 2:
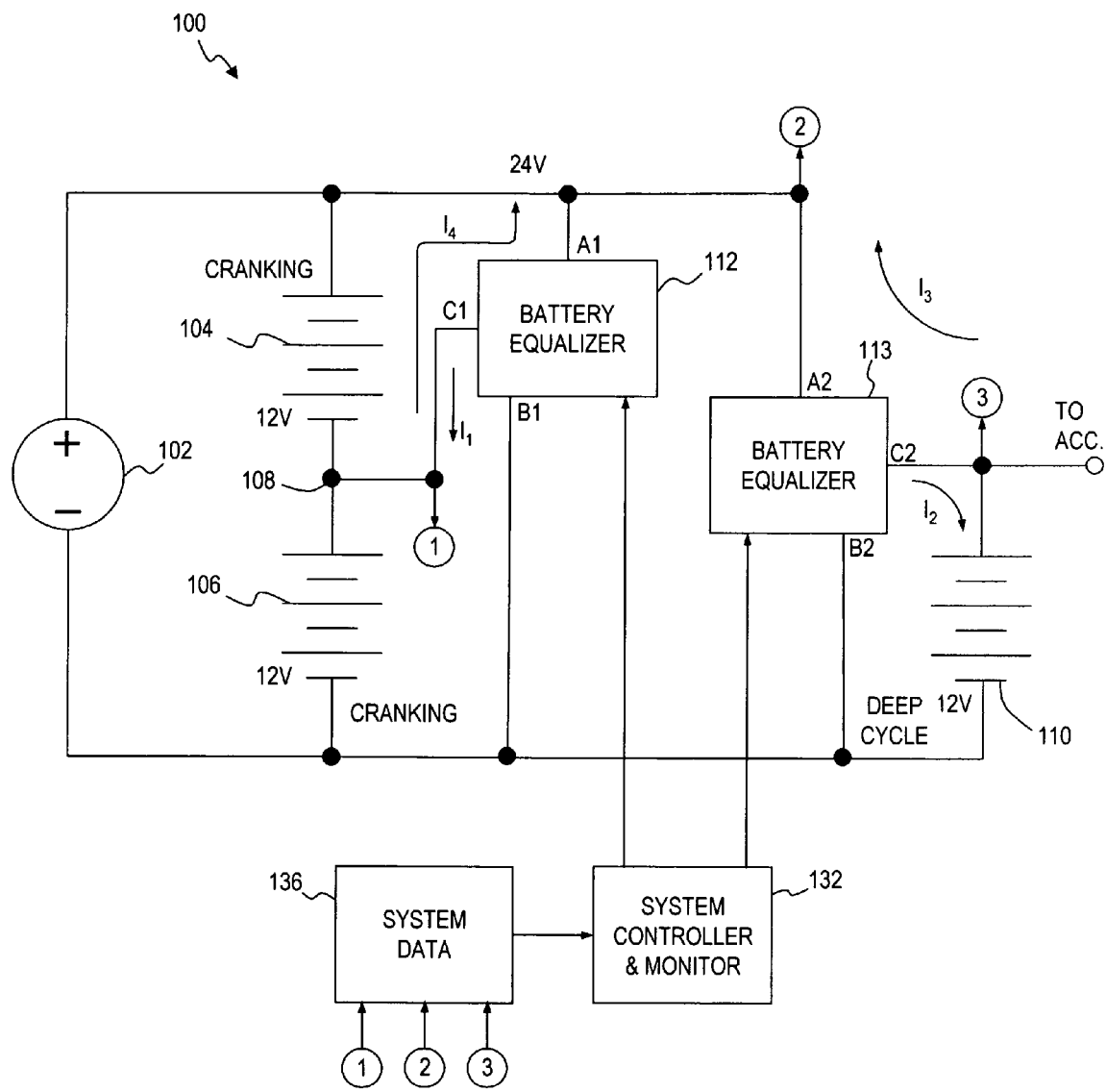
FIG. 2 a schematic block diagram of an electrical system control portion of a vehicle power management system according to an embodiment of the present invention.

With continued reference to FIG. 1, FIG. 2 depicts an expanded view of an electrical system control for a vehicle, designated 100. In the example shown herein, system 100 includes a charging source such as an alternator 102, providing 24 VDC power to the system, although any voltage may be selected to suit the needs of a particular vehicle. For example, some electric vehicles utilize 42 VDC power. A first and a second 12 VDC cranking battery 104, 106, are connected in series and are connected to the output of alternator 102 for charging. Batteries 104, 106 include a center tap connection 108. A DC-DC converter functioning as a first battery equalizer 112 is connected to the output of alternator 102, at terminals of equalizer 112 designated "A1" and "B1." Battery equalizer 112 provides lower battery 106 with a charging current $I_1$ at a predetermined, variable rate via a terminal designated "C1" and center tap 108, effective to maintain proper charging of battery 106 and equalize the charging of battery 106 with reference to the charging of battery 104.

A third battery 110, such as a deep-cycle battery, is used to provide 12 VDC electrical power to various accessories in the vehicle. A DC-DC converter functioning as a second bidirectional battery equalizer 113 is connected to the output of alternator 102, at terminals designated "A2" and "B2." Battery equalizer 113 provides third battery 110 with a charging current $I_2$ through a terminal designated "C2" at a predetermined rate suitable for charging the third battery.

Battery equalizer 113 is bidirectional, allowing battery 110 to provide a current $I_3$ via terminals C2 and A2 under certain conditions, such as when alternator 102 is not providing energy when the prime mover, such as a vehicle engine, is not operating. Current $I_3$ may be used to provide a charge current from third battery 110 to either or both of cranking batteries 104 and 106. For example, current $I_3$ may be connected directly to batteries 104, 106 in series. In addition, battery equalizer 112 may receive current $I_3$ at terminal A1 to provide a charging current $I_1$ to battery 106 via terminal C1 and center tap 108.

Likewise, battery equalizer 112 may be bidirectional, allowing battery 106 to provide a current $I_4$ via terminals C1 and A1 when alternator 102 is not providing energy. Battery equalizer 113 may receive current $I_4$ at terminal A2 to provide a charging current $I_2$ to third battery 110 via terminal C2.

Figure 3:
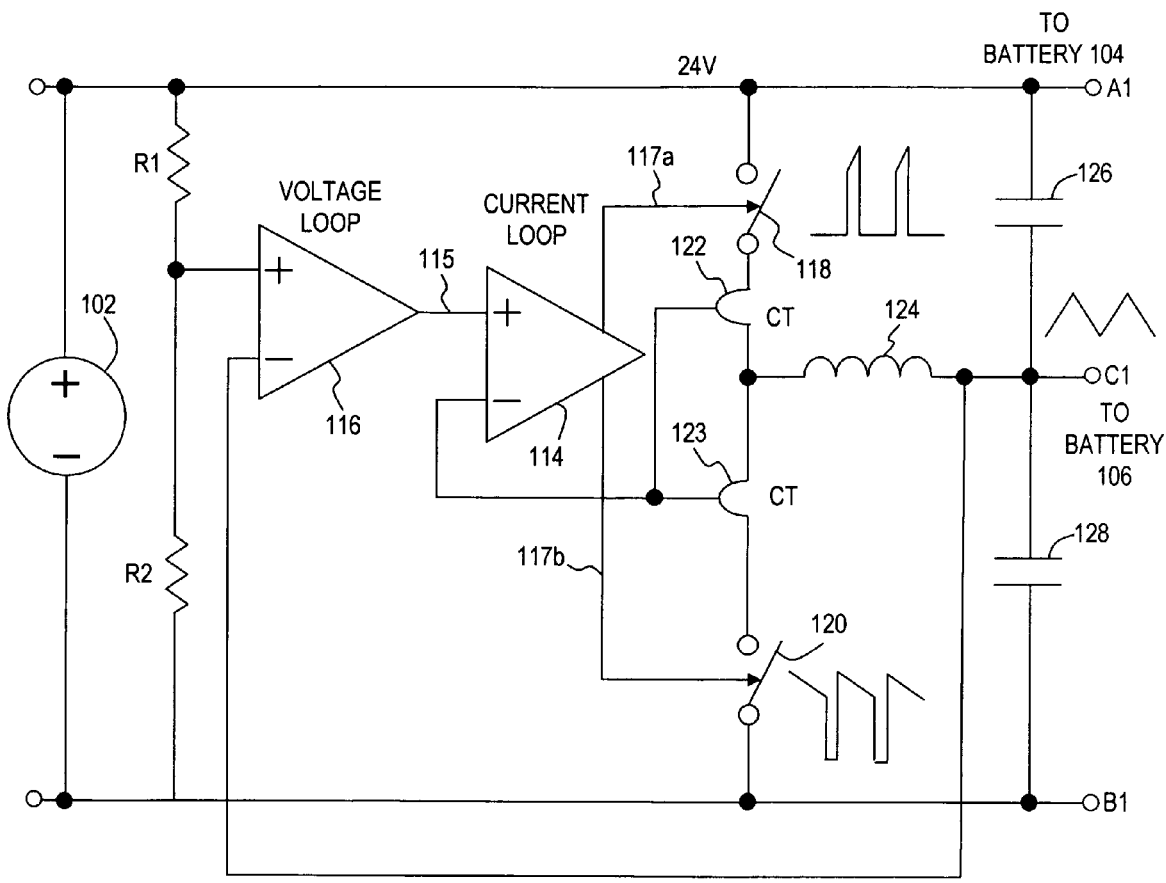
FIG. 3 is a simplified schematic diagram of an example topology for the battery equalizers of FIG. 2.
Figure 4:
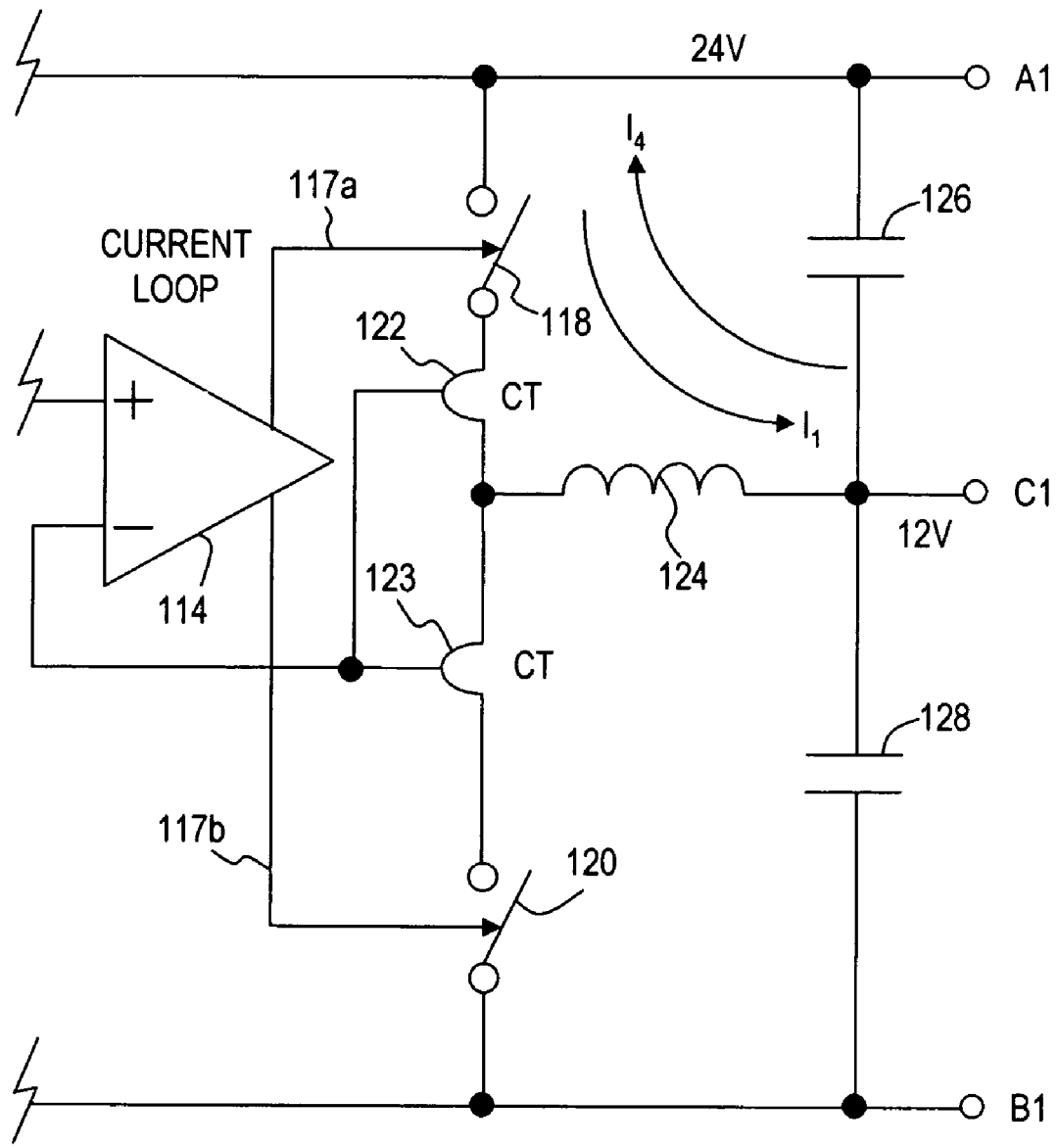
FIG. 4 is an expanded view of the output section of the battery equalizer topology of FIG. 2.

With continued reference to FIG. 2, pertinent details of battery equalizer 112 are shown in FIGS. 3 and 4. A current control loop formed around an operational amplifier ("op amp") 114 actuates a first and a second electronic switch 118, 120 respectively, coupling electrical energy from terminal A1 to terminal C1. This is effective to provide a predetermined charging current $I_1$ to battery 106 by controlling the duty cycle of the electronic switches. To control the duty cycle op amp 114 senses the peak current in switches 118, 120 via a pair of current transformers 122, 123, respectively and turns the switches OFF at a predetermined level of current. Switches 118, 120 cooperate with an inductor 124 to form a switching-type voltage converter. Since the average current through inductor 124 is generally proportional to the peak current in switches 118, 120, a feedback control is formed around op amp 114 and a voltage-control op amp 116 that uses local current and voltage feedback respectively to form a voltage-to-current converter. By using a voltage-to-current converter block inside an overall voltage feedback loop, a voltage regulator is formed where the control voltage sets the load current rather than the duty cycle of switches 118, 120. This approach is commonly known in the art as "current-mode programming" since the load current at terminal C1 is the directly controlled variable and the output voltage is controlled only indirectly.

With continued reference to FIGS. 2-4, the voltage control loop includes op amp 116 and a voltage divider comprised of a pair of resistors R1 and R2. The voltage divider is configured to provide a "+" terminal of op amp 116 with a reference voltage that is approximately half that of alternator 102. A "−" terminal of op amp 116 is connected to terminal C1 and receives the voltage of battery 106. In a first operational mode of battery equalizer 112, when the voltage at C1 is less than half the voltage of alternator 102, a pair of outputs 117a, 117b of op amp 114 controls the actuation and duty cycle of electronic switches 118, 120. Switches 118, 120 cooperate with inductor 124 to function as a conventional buck-type switching regulator to increase the amount of charging current $I_1$ being provided to battery 106. Conversely, when the voltage at C1 is greater than half the voltage of alternator 102, op amps 114, 116 control the actuation and duty cycle of electronic switches 118, 120 to decrease the amount of charging current $I_1$ being provided to battery 106. Inductor 124 also cooperates with a pair of filter capacitors 126, 128 to filter and smooth the charging current supplied to battery 106.

With continued reference to FIGS. 3 and 4, in a second operational mode of battery equalizer 112 current $I_4$ from battery 106 may be utilized to provide a charging current $I_2$ to third battery 110. In this operational mode a pair of outputs 117a, 117b of op amp 114 control the actuation and duty cycle of electronic switches 118, 120, which cooperate with inductor 124 to function as a conventional boost-type switching regulator to provide current $I_4$. The duty cycle of switches 118, 120 is varied as needed to increase or decrease the boost voltage, providing a correspondingly high or lower current $I_4$. Battery equalizer 113 receives current $I_4$ and converts it to current $I_2$, as will be described in more detail below, to charge third battery 110.

Switches 118, 120 may comprise any type of conventional solid-state switch including, without limitation, bipolar transistors, field effect transistors, solid state relays and the like. Current transformers 122, 123 may be any known type of current transformer including, without limitation, Hall effect devices, current shunts and wound transformers.

With reference to FIGS. 2 and 3, bidirectional battery equalizer 113 functions in the same manner as equalizer 112, acting as a buck-type switching regulator to provide a charging current $I_2$ from either alternator 102 or batteries 104, 106 to charge third battery 110. Battery equalizer 113 may also function as a boost-type switching converter in the manner previously described, providing a charging current $I_3$ to batteries 104, 106 in series. In this operational mode battery equalizer 112 may further receive charging current $I_3$ from third battery 110 and provide an equalizing charging current $I_1$ to battery 106.

With reference again to FIG. 2, a system controller and monitor 132 receives system data 136 including, without limitation, charge/discharge state of batteries 104, 106, 110, amount of load on each battery, output of alternator 102, and battery data such as age, condition and type. System data 136 may include other information including, without limitation, status and fault information for subsystems and components of bidirectional equalizers 112, 113.

System controller and monitor 132 provides the control functions associated with the operation and control of bidirectional battery equalizers 112, 113 including boost/buck mode control, voltage and current control loop setting and adjustment, charge/discharge control and fault monitoring. System controller and monitor 132 may monitor the condition of batteries 104, 106, 110 and the loads connected to each battery, and accordingly adjust the charge and discharge of each battery function not only to control the operation of battery equalizers 112, 113 at a subsystem level, but also to monitor and control the operation of system 100 and adapt the operational modes and characteristics of the subsystem components shown in FIGS. 1-4 and described in detail above, in order to maintain predetermined operational characteristics of the system. For example, system control and monitor 32 may monitor the states of batteries 106, 108, 110 and alternator 102, and re-configure the operation of battery equalizers 112, 113 to match the operational needs of the vehicle electrical system, such as using battery 110 to provide a charging current for cranking batteries 104, 106 in the event that the cranking batteries become depleted. System controller and monitor 32 may include a microcontroller, computer, microprocessor, programmable logic device or other similar device adapted to execute a predetermined set of instructions, such as a computer program.

In one operational mode, electrical system 100 may be configured such that battery equalizer 112 receives a charging current from alternator 102 and generates a controlled current to charge battery 106 in a predetermined manner so as to equalize the amount charge supplied to batteries 104 and 106.

In another operational mode, electrical system 100 may be configured such that battery equalizer 113 receives a charging current from alternator 102 and generates a controlled current to charge battery 110 in a predetermined manner.

In another operational mode battery 106 can support battery 104 through Equalizer 112 when external 12VDC loads are connected directly across battery 104.

In another operational mode battery 110 may support the 24 VDC bus through Equalizer 113 for example when cranking the engine from the 24 VDC bus.

In yet another operational mode, electrical system 100 may be configured such that a predetermined charging current is coupled from battery 106 to battery 110 through bidirectional battery equalizers 112, 113.

In still another operational mode, electrical system 100 may be configured such that a predetermined charging current is coupled from battery 110 to battery 106 through bidirectional battery equalizers 112, 113.

In yet another operational mode, electrical system 100 may be configured such that battery 110 is effectively connected in parallel with battery 106 through bidirectional battery equalizers 112, 113. This operational mode may be useful for temporarily adding current capacity to handle large loads. For example, battery 110 may be placed in parallel with battery 106 to assist with cranking loads associated with starting the vehicle's engine. Likewise, battery 106 placed in parallel with battery 110 may assist battery 110 when a heavy load is applied to battery 110, such as when additional accessories are connected. Controller and monitor 132, monitoring data 136, may select one or more operational mode in accordance with a predetermined set of instructions, such as a computer program.

As can be seen from the foregoing, controller and monitor 132 may be configured to selectably connect together two or more of batteries 104, 106 and 110 using one or more of bidirectional battery equalizers 112, 113 in accordance with a predetermined priority to provide current capacity corresponding to the current demand placed upon the electrical system by variable-demand loads such as engine staffer cranking loads and accessories that are added or removed from electrical system 100, or are switched on and off.

While this invention has been shown and described with respect to a detailed embodiment thereof, it will be understood by those skilled in the art that changes in form and detail thereof may be made without departing from the scope of the claims of the invention.

What is claimed is:

1. An electrical system control for a vehicle comprising:
a charging source;
a first battery connected in series with a second battery to form a primary power supply connected to the charging source;
a third battery forming a secondary power supply and selectably connectable in parallel with at least one of the first and second battery;

a first bidirectional battery equalizer connected to the charging source and further connected to the second battery;

a second bidirectional battery equalizer connected to the charging source and further connected to the third battery;

at least one load connected to at least one of the first, second and third batteries: the load providing a variable current demand; and a controller adapted to monitor the state of at least one of the charging source, the first, second and third batteries, and the load, the controller being configured to control the operation of at least one of the first and second bidirectional battery equalizers in a predetermined manner, wherein the controller adjustably reconfigures at least one of the bidirectional battery equalizers in accordance with the state of at least one of the charging source, the first, second and third batteries, and the load to selectably connect together the first, second and third batteries in accordance with a predetermined priority to provide current capacity corresponding to the current demand placed upon the electrical system by the load.

2. The electrical system control of claim 1 wherein the first battery equalizer further selectably receives a charging current from the charging source and generates a controlled current to charge the second battery in a predetermined manner.

3. The electrical system control of claim 1 wherein the second battery equalizer further selectably receives a charging current from the charging source and generates a controlled current to charge the third battery in a predetermined manner.

4. The electrical system control of claim 1 wherein a predetermined charging current is further selectably coupled from the second battery to the third battery through the first and second bidirectional battery equalizers.

5. The electrical system control of claim 1 wherein a predetermined charging current is further selectably coupled from the third battery to the second battery through the first and second bidirectional battery equalizers.

6. The electrical system control of claim 1 wherein the third battery is selectably connected in parallel with the second battery through the first and second bidirectional battery equalizers.

7. The electrical system control of claim 1 wherein at least one of the first bidirectional battery equalizer and the second battery equalizer further comprises a switching converter.

8. The electrical system control of claim 7 wherein the switching converter is reconfigurable by the controller as both a buck-type switching converter and a boost-type switching converter.

9. The electrical system control of claim 7 wherein the switching converter includes at least one of a voltage control loop and a current control loop.

10. The electrical system control of claim 1 wherein the controller is a microprocessor adapted to execute a predetermined set of instructions.

11. An electrical system control for a vehicle comprising:
a charging source;
a first battery connected in series with a second battery to form a primary power supply connected to the charging source;
a third battery forming a secondary power supply and selectably connectable in parallel with at least one of the first and second battery;
a first bidirectional battery equalizer connected to the charging source and further connected to the second battery, the first bidirectional battery equalizer including a switching-type converter;
a second bidirectional battery equalizer connected to the charging source and further connected to the third battery, the second bidirectional battery equalizer including a switching-type converter;
at least one load connected to at least one of the first, second and third batteries: the load providing a variable current demand; and
a controller adapted to monitor the state of at least one of the charging source, the first, second and third batteries, and the load, the controller being configured to control the operation of at least one of the first and second bidirectional battery equalizers in a predetermined manner by selective configuration of the direction of current flow through the first and second bidirectional battery equalizers and by selective reconfiguration of each of the first and second bidirectional battery equalizers as one of a buck-type switching converter and a boost-type switching converter,
wherein the controller adjustably reconfigures at least one of the bidirectional battery equalizers in accordance with the state of at least one of the charging source, the first, second and third batteries, and the load to selectably connect together the first, second and third batteries in accordance with a predetermined priority to provide current capacity corresponding to the current demand placed upon the electrical system by the load.

12. The electrical system control of claim 11 wherein the first battery equalizer further selectably receives a charging current from the charging source and generates a controlled current to charge the second battery in a predetermined manner.

13. The electrical system control of claim 11 wherein the second battery equalizer further selectably receives a charging current from the charging source and generates a controlled current to charge the third battery in a predetermined manner.

14. The electrical system control of claim 11 wherein a predetermined charging current is further selectably coupled from the second battery to the third battery through the first and second bidirectional battery equalizers.

15. The electrical system control of claim 11 wherein a predetermined charging current is further selectably coupled from the third battery to the second battery through the first and second bidirectional battery equalizers.

16. The electrical system control of claim 11 wherein the third battery is selectably connected in parallel with the second battery through the first and second bidirectional battery equalizers.

17. A method for controlling the electrical system of a vehicle, comprising the steps of:
providing a charging source, a first battery connected in series with a second battery to form a primary power supply connected to the charging source, and a third battery forming a secondary power supply and selectably connectable in parallel with at least one of the first and second battery;
connecting a first bidirectional battery equalizer to the charging source and to the second battery;
connecting a second bidirectional battery equalizer to the charging source and to the third battery;
connecting at least one load to at least one of the first and second batteries, the load providing a variable current demand; and
monitoring the state of at least one of the charging source, the first, second and third batteries and the load and controlling the operation of at least one of the first and second bidirectional battery equalizers in a predetermined manner, adjustably reconfiguring at least one of the bidirectional battery equalizers in accordance with the state of at least one of the charging source, the first, second and third batteries, and the load to selectably connect together the first, second and third batteries in accordance with a predetermined priority to provide current capacity corresponding to the current demand placed upon the electrical system by the load.

18. The method of claim 17, further including the steps of selectably receiving a charging current from the charging source and selectably generating a controlled current to charge the second battery in a predetermined manner.

19. The method of claim 17, further including the steps of selectably receiving a charging current from the charging source and selectably generating a controlled current to charge the third battery in a predetermined manner.

20. The method of claim 17, further including the step of selectably coupling a predetermined charging current from the second battery to the third battery through the first and second bidirectional battery equalizers.

21. The method of claim 17, further including the step of selectably coupling a predetermined charging current from the third battery to the second battery through the first and second bidirectional battery equalizers.

22. The method of claim 17, further including the step of selectably connecting the third battery in parallel with the second battery through the first and second bidirectional battery equalizers.

* * * * *

UNITED STATES PATENT AND TRADEMARK OFFICE
CERTIFICATE OF CORRECTION

| | |
|---|---|
| PATENT NO. | : 7,352,154 B2 |
| APPLICATION NO. | : 11/035830 |
| DATED | : April 1, 2008 |
| INVENTOR(S) | : Alexander Cook |

It is certified that error appears in the above-identified patent and that said Letters Patent is hereby corrected as shown below:

On the title page, Item (74), "James R. Elvey" should be --James R. Eley--; "Michael A. Forhand" should be --Michael A. Forhan--.

Signed and Sealed this

Twenty-third Day of September, 2008

JON W. DUDAS
*Director of the United States Patent and Trademark Office*